United States Patent [19]

Tidland et al.

[11] Patent Number: 5,025,693

[45] Date of Patent: Jun. 25, 1991

[54] SIDE SHIFTING APPARATUS FOR CUTTING BLADE IN A WEB SLITTING MACHINE

[75] Inventors: John W. Tidland, Vancouver; Reinhold A. Schable, Washougal, both of Wash.; Casey M. Vander Bom, Hillsboro, Oreg.; Borendra K. Biswas, Vancouver, Wash.; William R. Miller, Portland, Oreg.

[73] Assignee: Tidland Corporation, a Washington Corp., Camas, Wash.

[21] Appl. No.: 414,513

[22] Filed: Sep. 29, 1989

Related U.S. Application Data

[62] Division of Ser. No. 293,298, Jan. 3, 1989.

[51] Int. Cl.[5] ........................ B23D 19/02; B26D 1/14

[52] U.S. Cl. ........................................ 83/482; 83/499; 83/504; 83/699

[58] Field of Search ................ 83/482, 498, 499, 500, 83/501, 502, 504, 329, 330, 331, 349, 673, 676, 699; 493/34, 60, 365-367, 475, 474; 279/1 K

[56] References Cited

U.S. PATENT DOCUMENTS

| | | | |
|---|---|---|---|
| 2,187,211 | 1/1940 | McKinley | 83/482 |
| 2,211,216 | 8/1940 | Oster . | |
| 2,571,201 | 10/1951 | Clem | 83/501 X |
| 3,021,723 | 2/1962 | Happe . | |
| 3,143,024 | 8/1964 | Markowski . | |
| 3,185,010 | 5/1965 | Printz et al. . | |
| 3,186,282 | 6/1965 | Waterhouse . | |
| 3,380,330 | 4/1968 | Gilmore | 83/482 |
| 3,892,156 | 7/1975 | Johnstone | 83/469 |
| 4,257,299 | 3/1981 | Aykut | 83/499 X |
| 4,402,241 | 9/1983 | Moores, Jr. | 83/478 |
| 4,438,673 | 3/1984 | Noffke et al. | 83/502 |
| 4,540,394 | 9/1985 | Cavagna | 493/365 |
| 4,741,234 | 5/1988 | Colombo | 83/481 |
| 4,824,428 | 4/1989 | Cavagna | 83/482 X |

FOREIGN PATENT DOCUMENTS 0113668 7/1984 European Pat. Off. .

OTHER PUBLICATIONS

"System Helios," Manufacturer Catalogue (Tidland Corporation, Camas, Wash., 8/86).

*Primary Examiner*—Frank T. Yost
*Assistant Examiner*—Rinaldi Rada
*Attorney, Agent, or Firm*—Chernoff, Vilhauer, McClung & Stenzel

[57] ABSTRACT

A web slitting machine for cutting a web or roll of material includes an upper carriage assembly joined to a lower blade holder assembly by a selectively removable guide key which is milled to provide a predetermined cant angle for the blade. The blade is lowered into position by a piston which is rectangular and includes a torsion-resisting sleeve to prevent rotation of the piston about its vertical axis. A pneumatic control provides a plurality of control modes whereby the blade may be raised and lowered with or without locking the upper carriage assembly to its transverse bar and vice-versa. A unique side shift adjustment is provided whereby the blade may be shifted to a half-stroke position and the upper carriage locked when the blade is positioned against a lower knife. This ensures that the pressure of the blade against the knife is the pressure exerted at the mid point of the stroke. A parallelogram linkage biased by a spring provides a shock absorber for maintaining blade/knife contact in the presence of webs moving at high speed.

5 Claims, 9 Drawing Sheets

SIDE SHIFTING APPARATUS FOR CUTTING BLADE IN A WEB SLITTING MACHINE

This is a divisional of copending application(s) Ser. No. 07/293,298 filed on Jan. 3, 1989.

BACKGROUND OF THE INVENTION

The following invention relates to a web slitting machine of the type used for cutting a continuous web of material.

Web slitters are cutting machines commonly employed to cut an endless web, such as a continuous roll of material, into strips. Typical machines of this type include an upper blade portion which overlaps with a lower knife to provide a scissors-like action for cutting a continuous roll as it is pulled between the blade and the knife. The blade is usually a nonpowered rotary cutting disk suspended from a carriage which is attached to a transverse bar. A plurality of web slitters may be connected to the same bar to create parallel strips of various widths. The lower knife may be a blade supported from underneath the roll or may be a roller or drum having a sharpened edge. Together the lower knife and the upper blade create a shearing action against the web as it unwinds from a roll and is pulled through the web slitter by a rewind or take-up roll.

It is important in the design of such machines that the shear or cant angle between the upper blade and lower knife be precisely maintained. The cant angle is the angular relationship between the upper blade and the lower knife in the plane of the blade about a vertical axis. This angle must be maintained so that the wear and deformation between the two cutting edges are kept to a minimum. The cant angle should also be adjustable to compensate for various blade-to-web orientations as well as various types of web material. Rotation of the upper blade about the aforementioned vertical axis results in deviations from the desired cant angle and various approaches have been tried to correct this problem.

One such approach is shown in Markowski U.S. Pat. No. 3,143,024. In the Markowski device, the upper blade is supported on a shaft which is clamped to a support assembly connected to a transverse bar. The shaft includes a milled surface which is held against a tapered block to create the desired cant angle, and the tapered block may be replaced for other blocks of different dimensions, thereby providing adjustability. Another approach is to use a clamp and a knife shaft which are replaceable, so that various cant angles may be obtained by substitution of these parts, an example of which is shown in Waterhouse U.S. Pat. No. 3,186,282. Various types of screw adjustments are shown in Printz, et al., U.S. Pat. No. 3,185,010, Johnstone U.S. Pat. No. 3,892,156 and Aykut U.S. Pat. No. 4,257,299, and differential springs are used for setting the cant angle in Noffke, et al., U.S. Pat. No. 4,438,673.

The problem with all of the aforementioned devices is that the means for holding the blade in a predetermined cant angle position is not strong enough to maintain the angle when the web slitter is subjected to the force of the moving web. Moreover, springs and screws which may be easily adjusted are also subject to tampering. The use of a replaceable tapered block as shown in Markowski alleviates the problem of tampering; however, the block bears against but a small flattened portion of the blade-supporting shaft. Moreover, the pressure holding the tapered block is maintained by a clamp tightened by a knob acting on a threaded shaft. If the shaft becomes loose, the blade will wobble.

Some web slitters mount a blade holder along a track to provide for easy replacement of the blade. An example of this construction is shown in Colombo, U.S. Pat. No. 4,741,234. The track mounting of Colombo, however, is integral to the upper carriage assembly and provides no adjustability for the cant angle. Moreover the blade holder portion is not reversible on the track. Reversibility would be a desirable feature since it is sometimes necessary to mount the carriage for left-hand as well as right-hand operation.

It is critical to the maintaining of proper alignment of the blade and lower knife that the blade-supporting shaft does not rotate. Most shafts are round, but some attempts have been made to keep the shaft from rotating by milling portions of it to a flat shape and providing a bearing pressing against the flattened portion to prevent rotation. An example is shown in the Cavagna EPO Patent Application No. 84/100104.3. Other approaches include a keyed shaft as shown in the Johnstone '156 patent and a trangular-oval piston shown in Wingen, U.S. Pat. No. 3,434,695. The problem with these shapes is that they are either expensive to manufacture, or do not provide sufficient rigidity to keep the shaft from rotating.

Another design aspect of conventional web slitters is that many include pneumatic actuation features for locking the web slitter to a transverse bar, for lowering the blade into a cutting position, and for laterally shifting the blade towards and away from the knife. These functions are usually performed in a predetermined sequence, which may limit the flexibility of any pneumatic control system that may be employed. An example is shown in Cavagna U.S. Pat. No. 4,540,394, in which the actuation of the pneumatic control which locks the upper carriage to a transverse bar also simultaneously lowers a piston supporting the lower blade assembly. With such a system it is not possible either to unlock the carriage from the transverse bar without raising the blade, or to lock the carriage to the transverse bar without lowering the blade. There may exist situations, however, in which it would be desirable to be able to raise the blade without unlocking the carriage, or where it would be desirable to have the blade lowered but have the ability to move the carriage along the transverse bar.

As mentioned above, a plurality of web slitters of the type described herein may be mounted on a transverse bar and may be positioned along the bar at various locations to define the width of strips to be cut from the web. An arrangement for setting the desired transverse location along the bar using a top mounted knob driving a pinion which interacts with a rack on the bar shown in the "System Helios" web slitter manufactured by Tidland Corporation of Camas, Wash. The knob is inconveniently placed, however, and is, for that reason, awkward to use. Also, the sideways movement tends to cause "crabbing" as the web slitter will experience a tilting moment about its horizontal axis as the carriage moves transversely.

Many conventional web slitters include a pneumatic side shift feature which moves the blade laterally into contact with the lower knife. This usually occurs after the blade has been lowered. Examples are shown in the U.S. patents to Johnstone, U.S. Pat. No. 3,892,156 and Gilmore, U.S. Pat. No. 3,380,330. No provision is made, however, in either of these two devices for quickly retracting the blade laterally before the blade is raised. The problem that can occur when the blade is raised without sideways retraction, is that it may scrape across the edge of the lower knife which can cause chipping or dulling.

Web slitters which include a side shift feature as described above also encounter the problem that when the blade shifts, it must contact the lower knife with pressure sufficient to maintain the blade against the lower knife in a good cutting relationship, but not have so much pressure so as to cause the blade to tilt. This requires some guesswork as to where to clamp the carriage portion along the transverse bar.

This problem is inherent in the Johnstone '156 device and in a device shown in the Gilmore '330 patent, both of which include pneumatic side shifting actuators which automatically shift the blade laterally upon completion of the downstroke. A desirable feature in such devices would be a mechanism permitting optimum adjustment of the force of the blade against the lower knife.

Continuous web material which is forced through a gang of web slitters is not always uniform. It frequently contains irregularities which may have a tendency to force the blade away from the lower knife, notwithstanding the pneumatic pressure imparted by the side shifting mechanism. When the web travels at high speed, this becomes a problem since the friction in the piston and cylinder arrangement used in the side shift mechanism prevents it from reacting quickly enough to prevent oscillations of the blade. Thus, it would be desirable to provide a fast-acting biasing or shock absorbing means for high speed moving webs to damp blade oscillation and to create a restoring force that will maintain the blade in proper contact with the lower knife.

The blade portion of a conventional web slitter is a nondriven freely rotating disk. The disks are clamped with screws or the like to a hub and must periodically be replaced when they become dull. This can be a dangerous operation because the operator must usually grasp the blade along its edge to stop it from rotating while a blade retainer or clamp is removed. A desirable feature would be one that prevented blade rotation while it was being replaced.

SUMMARY OF THE INVENTION

The present invention provides solutions for the aforementioned problems in web slitter design and provides improvements in such design to increase efficiency, accuracy and versatility.

The web slitter of the present invention includes an upper carriage assembly connected to a transverse bar, and a blade holder assembly for holding a cutting blade, where the blade holder assembly is coupled to the carriage assembly by a selectively removable connector which joins the two assemblies together at a predetermined cant angle. The connector comprises a guide key which is selectively coupled to the carriage assembly and has a shape for slideably engaging a correspondingly shaped channel in the blade holder assembly. The guide key is milled to provide a predetermined cant angle, and also has a flaring portion which bears the weight of the blade holder assembly when the latter is slideably engaged. An important feature of this arrangement is that the blade holder portion is reversible on the guide key and may slide onto the guide key in either a right-hand or left-hand orientation.

In order to maintain the precise cant angle provided by the guide key, the carriage assembly includes a reciprocating shaft which moves the blade holder assembly towards and away from a lower knife. The shaft is of a substantially rectangular shape and is movable within a guide cylinder. The guide cylinder includes wear plates which bear against the shaft to prevent rotation about its axis. The square cross section of the shaft provides the optimum resistance to torsion about the shaft axis and the wear plates include a pair of selectively insertable bushings which are fastened to the bottom of the cylinder housing and have wear portions that extend into the cylinder along a length of the shaft to form an interior rectangular sleeve.

Another aspect of the invention relates to a versatile control system for selectively locking the carriage portion to a transverse support bar, and for lowering and raising the blade holder portion. An actuating system, which may be pneumatically powered, raises and lowers the blade into and out of a cutting position and provides a brake for releasably locking the carriage to the transverse support bar. A selectable control provides a plurality of control modes for controlling the actuator so that the brake may be locked without moving the blade, or the blade may be raised or lowered with the brake in either a locked or unlocked position. This may be accomplished by having a plurality of simultaneously selectable valve pairs coupling a source of pneumatic pressure to the brake or blade reciprocator with each valve pair providing a different control mode.

In order to properly adjust the correct amount of force at the point of overlap between the blade and the lower knife, a novel side shifting arrangement is provided. The carriage may be positioned at any point along the transverse bar by a rotary control which turns a pinion gear which, in turn, interacts with a rack on the transverse bar. The blade holder assembly includes a side shifting mechanism which moves the blade a short distance laterally into and out of engagement with the lower knife. This mechanism includes a spring which biases the side shifting mechanism towards a nonengaged position while an actuator, which may be pneumatic, urges the blade against the spring to engage with the lower knife. A half stroke stop halts the lateral movement of the blade midway between its engaged and retracted positions. The carriage may then be locked in place on the transverse bar where the blade and lower knife touch. This adjustment ensures that the pressure that the blade places on the lower knife when the side shifting mechanism is actuated equals the pressure at midstroke.

In order to prevent the oscillation of the blade in the presence of a high speed moving web, the blade holder is divided into a stationary portion and a movable hub assembly connected by a linkage. The linkage includes a torsion spring for providing a restoring force which responds to blade oscillation. The linkage may comprise a spring-loaded pivotable parallelogram linkage which permits movement of the hub assembly in a lateral direction without tilting the blade.

An object of this invention is to provide a web slitter capable of precisely maintaining a predetermined selectable cant angle between a blade and a lower knife.

A further object of this invention is to provide a selectively removable guide key which serves as a connecting link between an upper carriage assembly and a blade holder assembly, and which has a shape that determines the cant angle between the blade and a lower knife.

A still further object of this invention is to provide a connection between an upper carriage assembly and a lower blade holder assembly in a web slitter that allows for reversibility of the blade holder assembly on the carriage assembly.

A still further object of this invention is to provide a control system for selectively controlling the locking of the carriage portion of a web slitter to its transverse support and for lowering the blade into engagement with a lower knife, so that a plurality of control options may be provided whereby the raising and lowering of the blade may be accomplished independently of the locking of the carriage.

A still further object of this invention is to provide a web slitter which is transversely adjustable by means of a conveniently located control.

Yet a further object of this invention is to provide a web slitter having a lateral blade side shifting feature with the ability to quickly release the side shift mechanism so as to avoid the scraping of the blade against the knife as the blade is raised from its engaged position.

A still further object of this invention is to provide a means for adjusting the side shift mechanism of a blade for optimum pressure against the lower knife when the blade carriage is locked in a predetermined transverse location.

Yet a further object of this invention is to provide a safety feature for blade removal which prevents the rotary blade from rotating while a hub clamp is removed for effecting the changing of blades.

A still further object of this invention is to provide a resilient suspension for a rotary blade having low friction and a substantially constant restoring force in the transverse direction to respond to the oscillation of the blade in the presence of a high speed moving web.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
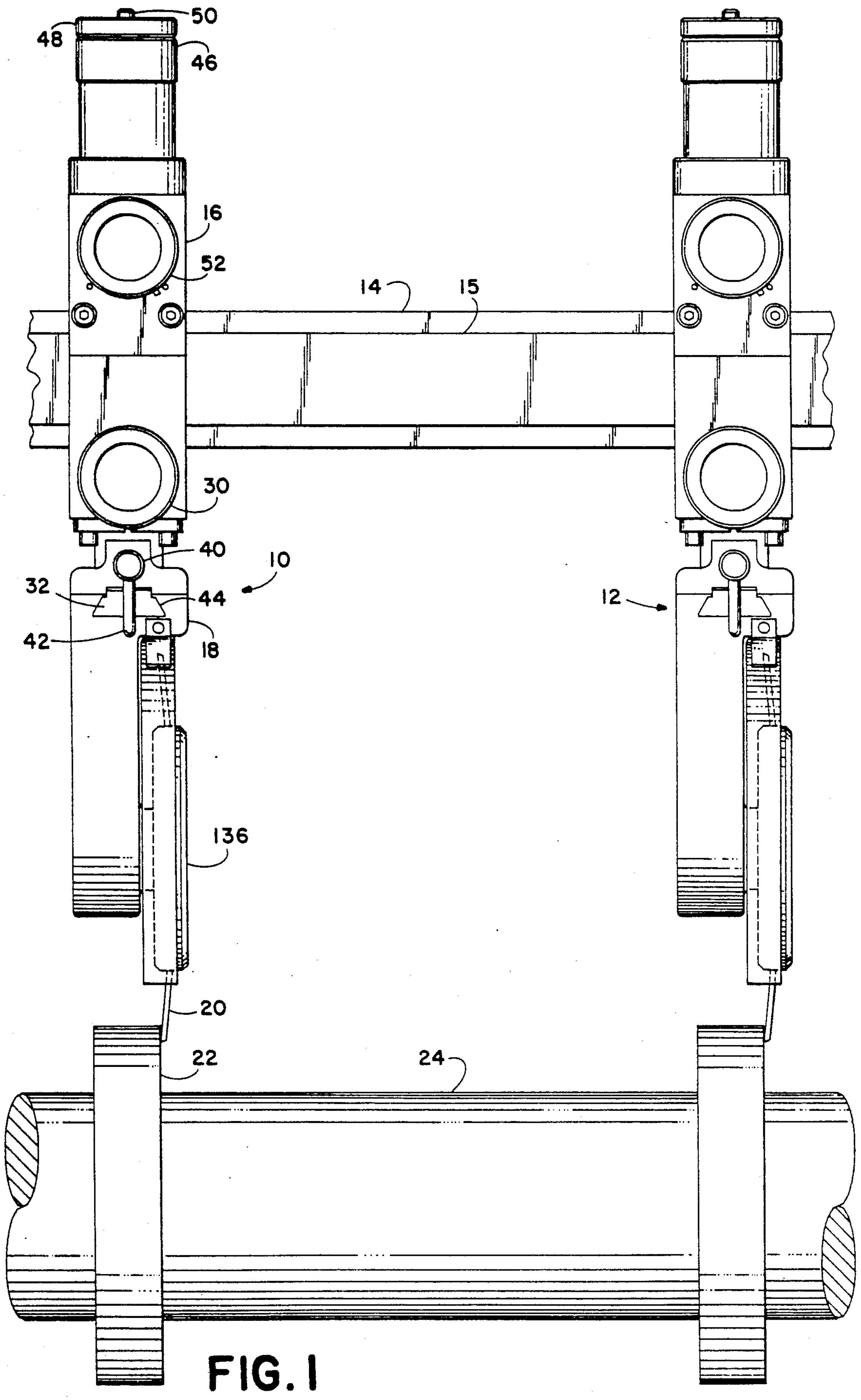
FIG. 1 is a front view of a pair of web slitting machines and their cooperating lower knives mounted on respective transverse supports.

Referring to FIG. 1 a pair of web slitting machines 10 and 12 are mounted on a transverse bar 14. The web slitter 10 includes an upper carriage portion 16 which is slideably movable along the transverse bar 14, and a lower blade holder portion 18 which includes a freely rotating disk-shaped blade 20. The edge of the blade 20 overlaps with a lower knife 22 positioned on a supporting sleeve 24. The lower knife 22 may be in the form of a drum or roller which has a sharpened edge so that together the blade 20 and the lower knife 22 present a scissors like action to a continuous web of material which is pulled through the blade 20 and the knife 22 by a drum or take-up reel. The web slitter 12 is in all respects similar to the web slitter 10 and the width of the strips cut in the continuous web of material may be determined by the transverse location of one web slitter relative to another. There may, of course, be as many such cutting machines located on the transverse bar 14 and the sleeve 24 as desired.

Figure 2:
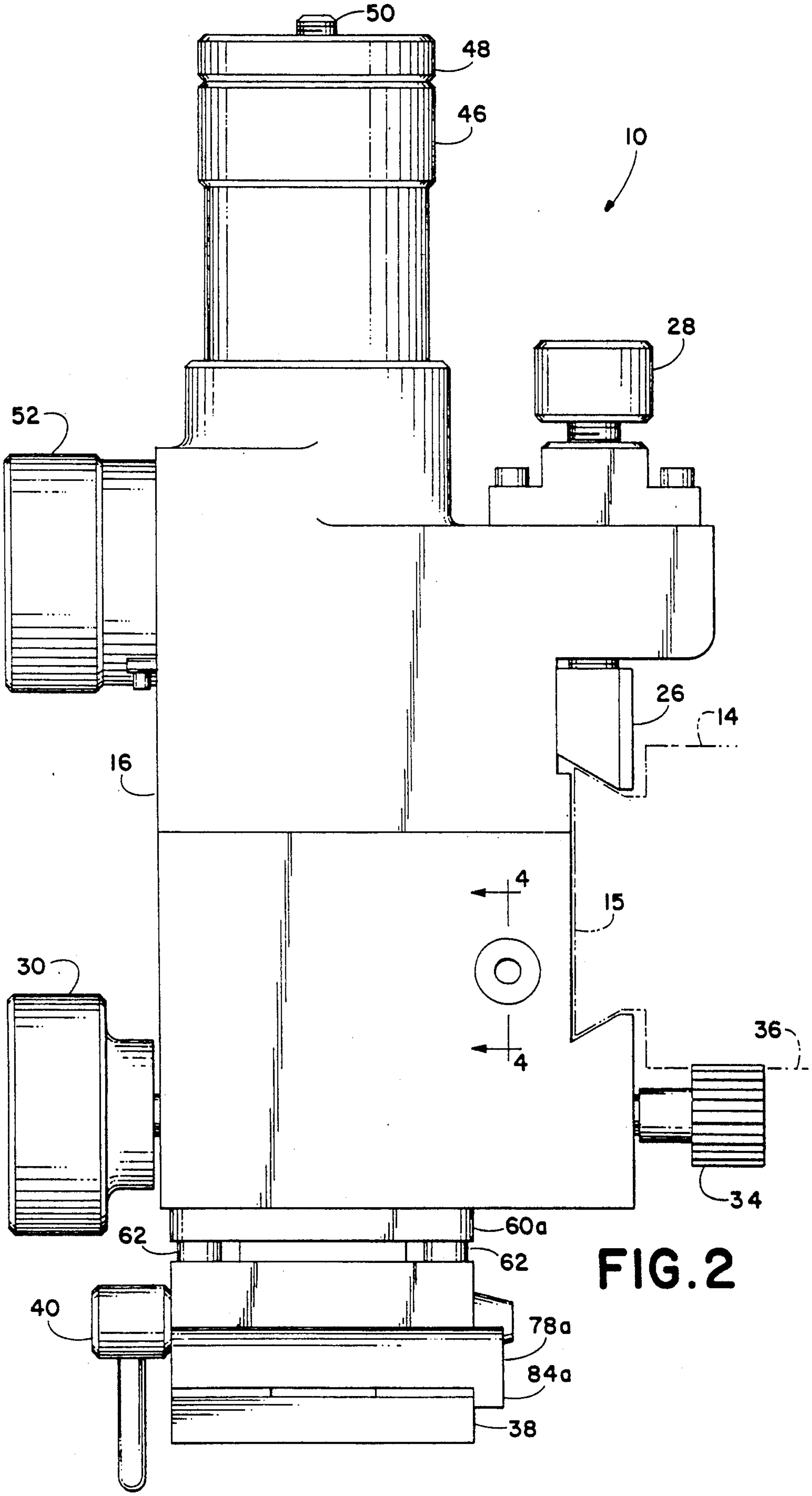
FIG. 2 is a side view of the upper carriage assembly of a web slitting machine constructed according to the invention.

Referring to FIG. 2, the upper carriage portion 16 of web slitter 10 includes a brake shoe 26 which engages a dovetail shaped projection 15 of the transverse bar 14. The brake shoe 26 may be operated pneumatically or by turning rotary brake knob 28. The transverse position of the carriage assembly 16 along the transverse bar 14 is adjusted by turning transverse control knob 30 which is connected to a shaft 32 (see FIG. 8) which terminates in a pinion gear 34. The pinion gear 34 meshes with the teeth of a rack 36 formed in the lower portion of transverse bar 14. The transverse position-adjusting knob 30 is located on the front of the upper carriage assembly 16 to provide easy accessibility for this adjustment by the operator, and the shaft 32 extends substantially through the web slitter 10 underneath the bar 14 permitting the slitter to be lifted while the knob 30 is turned. Transverse adjustments may then be made without imparting a moment which would cause tilting or crabbing.

The upper carriage assembly 16 is connected to the lower blade holder assembly 18 by a dovetail shaped guide key 38 which is selectively removable from the upper carriage assembly 16 by a locking pin 40. The pin 40 has a handle 42 which permits it to be rotated 90 degrees so that the pin may be removed thus permitting removal of the guide key 38. The guide key 38 may be milled to provide various cant angles for the blade 20, and includes a dovetail shaped bar 21 which forms a slideable connecting link between the upper carriage assembly 16 and the lower blade holder assembly 18. Milling the bar 21 to differing tolerances along its sides provides variations in the cant angle of the blade because the lower blade holder assembly 18 includes a dovetail shaped guide channel 44 (refer to FIG. 12) which snugly engages the dovetail bar 21. In addition, the weight of the lower blade holder assembly is borne by the outwardly flaring portions of the bar 21, thus forming the major structural connection beween the upper carriage assembly 16 and the lower blade holder assembly 18. An added feature of this construction is that the blade holder assembly 18 may be reversed relative to the upper carriage assembly 16 by merely sliding the blade holder assembly 16 off of the bar 21, rotating it 180 degrees, and sliding it back on thus permitting either right-hand or left-hand orientation.

The lower blade holder assembly 18 is raised or lowered by a reciprocating shaft as will be explained below. The stroke of the shaft is adjusted by a stroke stop nut 46 in conjunction with a locking nut 48. Both the stop nut 46 and the locking nut 48 are threadingly mounted on stroke stop rod 50.

A rotary control knob 52 provides mode control for the pneumatic systems which power the locking of the upper carriage assembly 16 to the transverse bar 14, the lowering of the blade holder assembly 18 towards the lower knife 22, and the shifting of the rotary blade 20 laterally towards the lower knife 22. These functions are also explained in more detail below.

Figure 5:
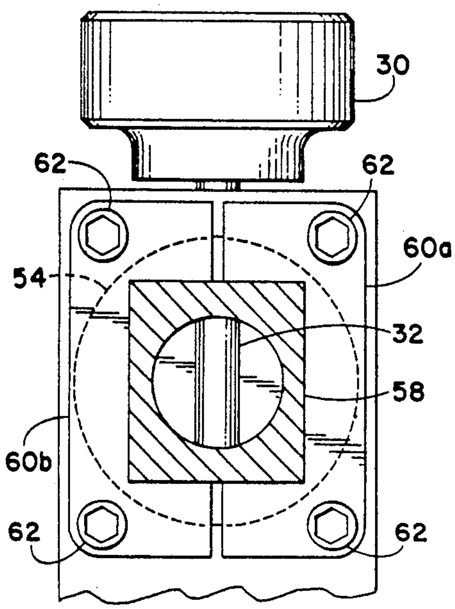
FIG. 5 is a cutaway view taken along line 5—5 of FIG. 3.
Figure 8:
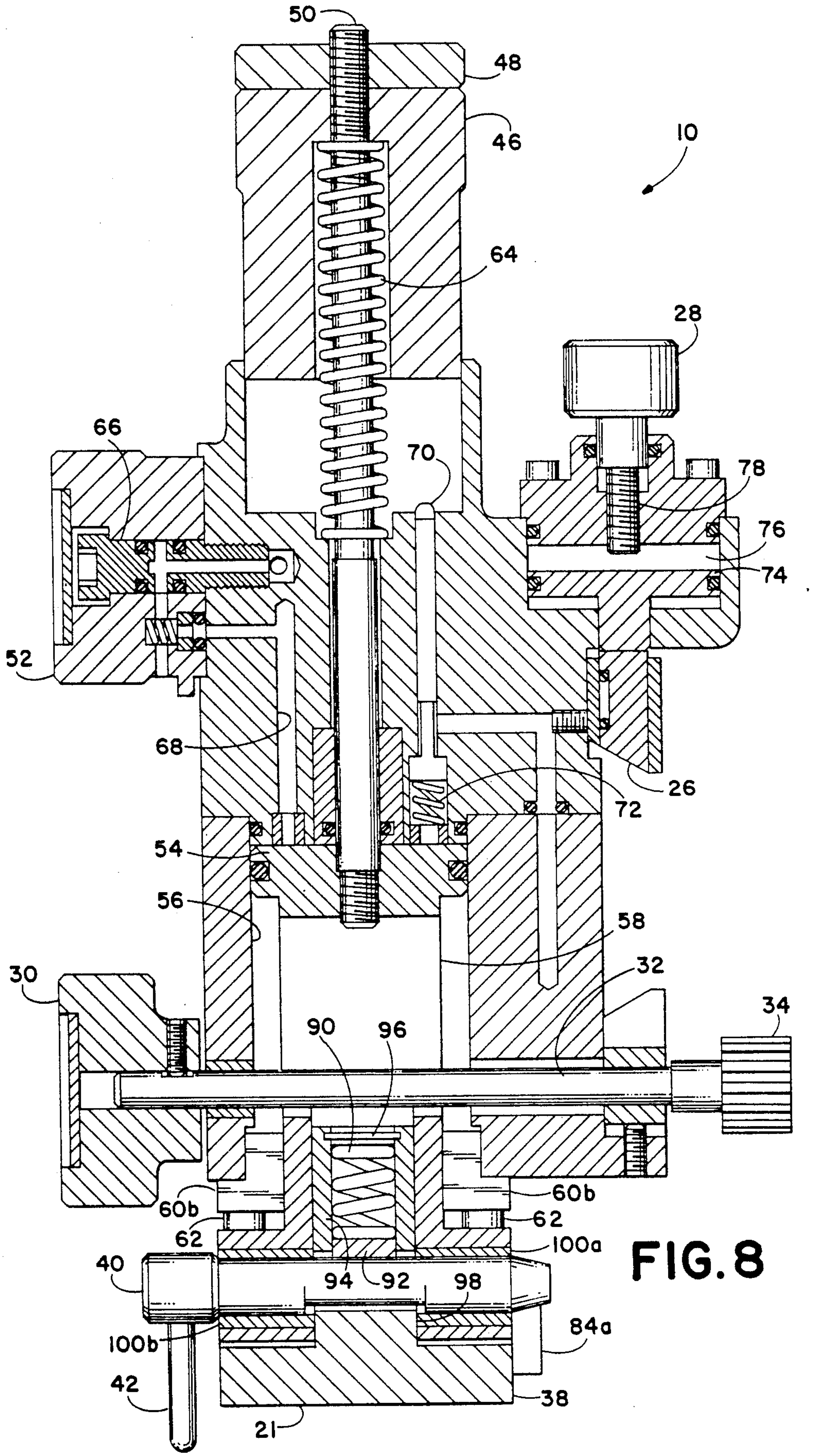
FIG. 8 is a side cutaway view of the upper carriage assembly of the web slitting machine shown in FIG. 2.

Referring to FIG. 8, the stroke stop rod 50 is threaded into the top of a piston 54 which slides within a cylinder 56. The piston 54 includes a piston rod 58 of substantially square cross section which bears against rod guide bushings 60*a* and 60*b* (refer to FIG. 5). The rod guide bushings 60*a* and 60*b* comprise a pair of V-shaped plates which have rectangular legs extending into the cylinder 56 to slideably engage the piston rod 58. The bushings 60*a* and 60*b* are screwed together in abutting relationship by bolts 62 through slightly oversized holes (not shown) which permits the bushings 60*a* and 60*b* to be pressed together to snugly engage the piston rod 58 before the bolts 62 are tightened down. Thus tightened, the rod guide bushings 60*a* and 60*b* prevent the piston rod 58 from rotating, thus preserving the rather fine cant angle tolerance which is determined by the milling of the dovetail bar 21 of guide key 38.

The rotary control knob 52 controls the supply of compressed air to the top of piston 54 which pushes the piston down against the return bias force imparted by a spring 64 which is wound about stroke stop rod 50. The compressed air is supplied to the upper carriage assembly 16 from a source 104 (refer to FIG. 9) where it is connected through a set of valves generally indicated at 66 to a conduit 68 bored through the body of the upper carriage assembly 16 and terminating at the top of cylinder 56. As compressed air forces the piston 54 downwardly, the stop nut 46 approaches a plunger 70, and when the stop nut 46 bottoms against the plunger 70, depressing it against a spring 72, a valve is opened which supplies compressed air to a side shifting mechanism (explained in more detail below) in the lower blade holder assembly 18.

The brake shoe 26 is raised and lowered by a piston 74 which slides vertically within brake cylinder 76. The piston 74 may also be lowered by manually tightening rotary brake knob 28 which causes a threaded bolt 78 to bear against the top of the piston 74.

Figure 14:
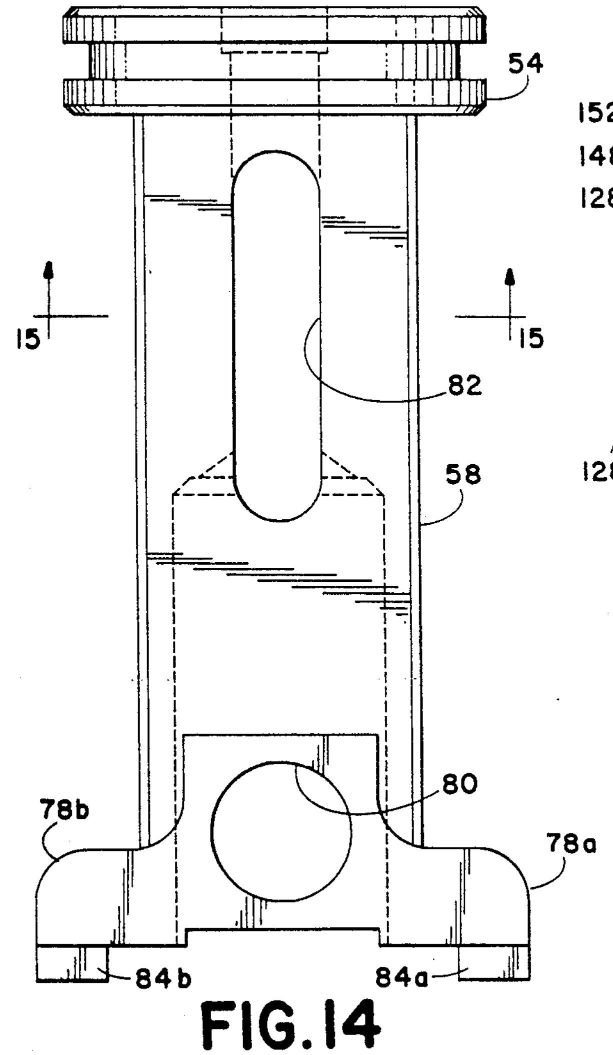
FIG. 14 is a front view of a piston which is slideably mounted within the upper carriage portion of the web slitter as shown in FIG. 8.

Referring to FIG. 8 and FIG. 14 the piston 54 includes a pair of legs 78*a* and 78*b* with a center aperture 80 lined with bushings 100*a* and 100*b* which permits the insertion of the locking pin 40. The piston 54 includes a slot 82 through which the shaft 32 extends. The legs 78*a* and 78*b* include stop tabs 84*a* and 84*b* which prevent the lower blade holder assembly from sliding off of the guide key 38 once it is locked into place by the pin 40.

Figure 6:
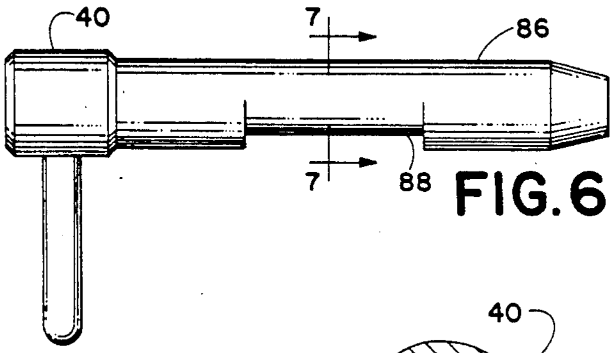
FIG. 6 is a side view of a locking pin shown in the lower portion of FIG. 3.
Figure 7:
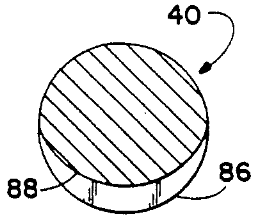
FIG. 7 is a cutaway view taken along line 7—7 of FIG. 6.

The locking pin 40 includes a round shaft 86 which has a cam portion 88 (refer to FIGS. 6 and 7). When the handle 42 of the pin 40 is pointing downwards the cam portion 88 of the shaft 86 also extends downwardly. The guide key 38 is an assembly which includes a spring 90 bearing against a movable bushing 92. The spring 90 and the movable bushing 92 are held within a cylindrical extension portion 94 by a retaining washer 96. The cylindrical extension 94 includes an aperture (not shown) which lines up with aperture 80 to permit insertion of the locking pin 40.

Figure 3:
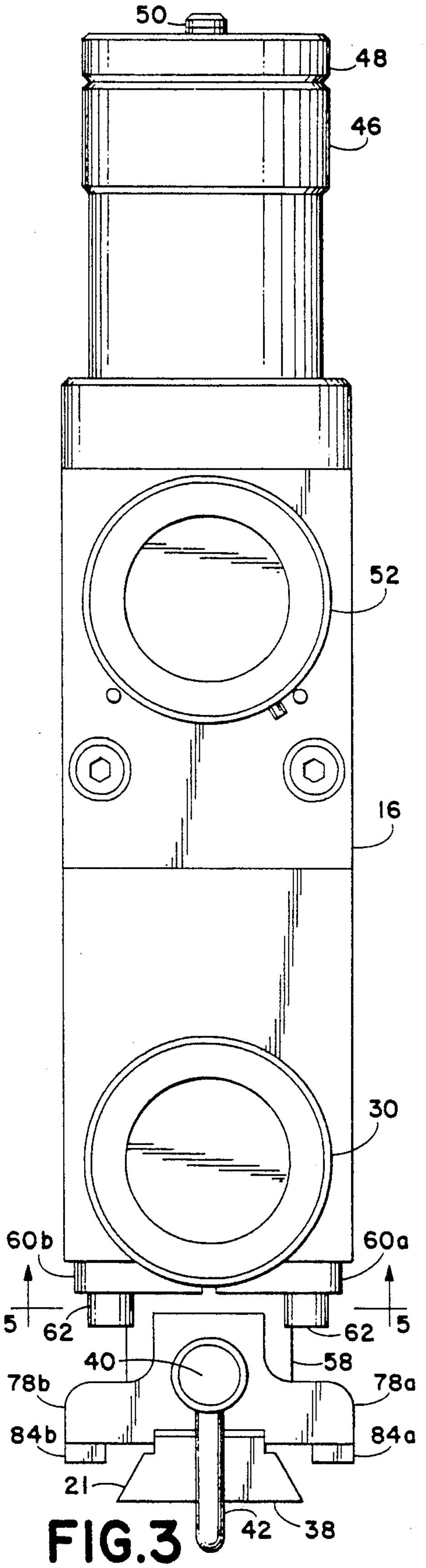
FIG. 3 is a front view of the upper carriage assembly of FIG. 2.

The locking pin 40 is inserted with the handle 42 turned 90 degrees to the side from its position shown in FIG. 3. Moving the cammed surface 88 to the side allows the round shaft to enter the aperture 80 and to depress a projecting insert 98 from the top part of the guide key 38 forcing it down and compressing the spring 90 against the bushing 92. Once the pin 40 is inserted, the handle 42 may be turned to the "down" position presenting the cammed surface to the insert 98. The spring 90 bears against the bushing 92 and draws the guide key upwardly against the bottom of the piston 54. The projection 98 then prevents the pin from slipping out of the aperture 80, and the spring 90 provides a force tending to draw the guide key 38 up against the legs 78*a* and 78*b* of the piston 54.

Figure 9:
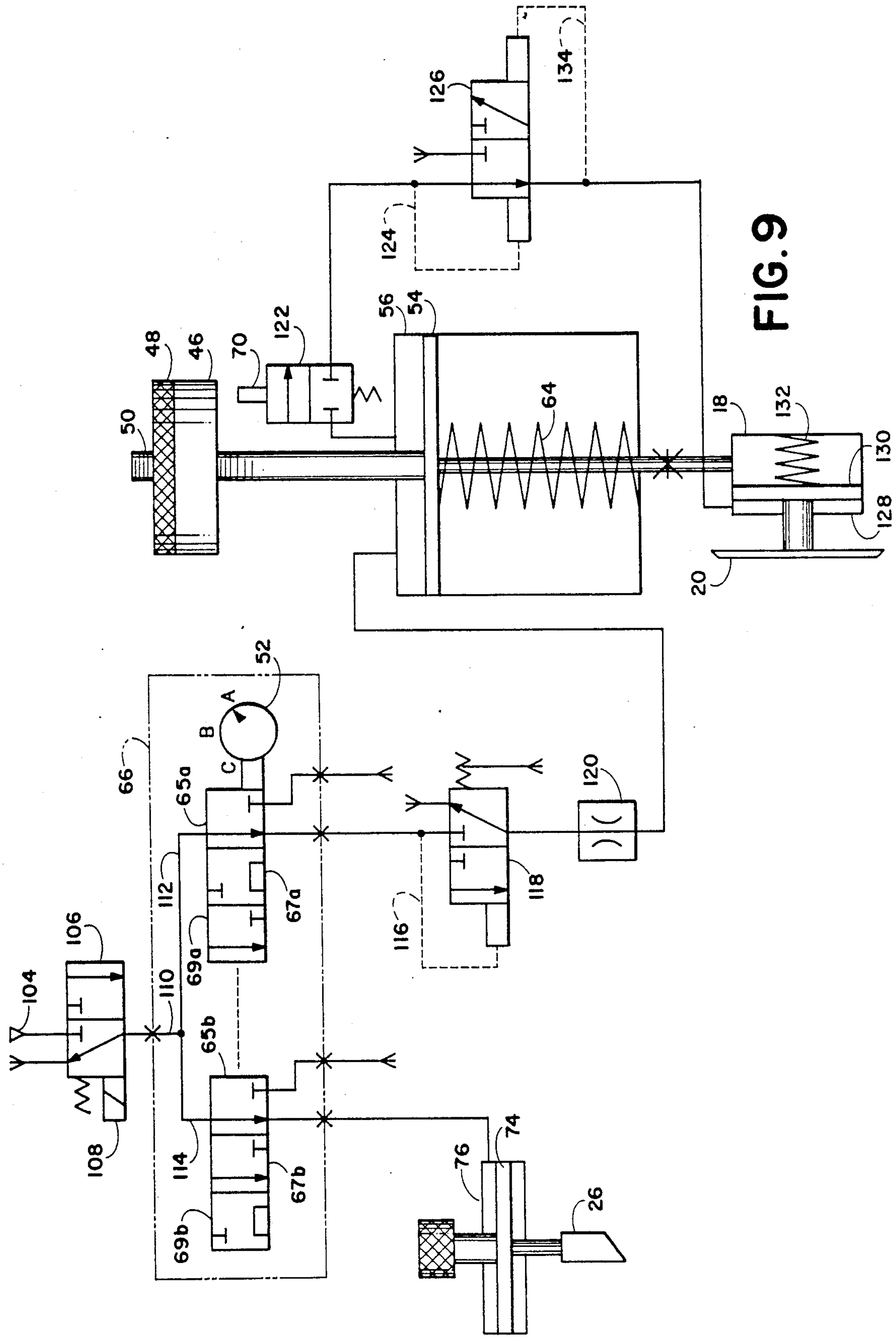
FIG. 9 is a schematic diagram of a pneumatic control circuit used to control various functions of the web slitting machine of FIG. 1.

The pneumatic circuit for the web slitter 10 is shown in FIG. 9. The rotary control knob 52 is part of a set of ganged valves 66. Rotating the control knob 52 connects a selected valve pair to pneumatic lines 112 and 114, respectively. For example, in the A position valves 65*a* and 65*b* are coupled to lines 112 and 114, respectively. In the B position valves 67*a* and 67*b* will be coupled to lines 112 and 114, and in the C position valves 69*a* and 69*b* will be coupled to the same lines. Lines 112 and 114 are connected to input-output line 110 which is, in turn, connected to a valve 106 which is controlled by solenoid 108. A source of pneumatic pressure 104 is connected to valve 106. The output of the selected one of the valves 65*b*, 67*b* or 69*b* is connected to the brake cylinder 76. Pressure in cylinder 76 forces brake piston 74 in a downward direction locking the brake shoe 26 against the transverse support rod 14. Line 112 is connected from the selected one of valves 65*a*, 67*a* or 69*a* to cylinder 56. Pneumatic pressure in the cylinder 56 lowers the piston 54 which in turn lowers the blade holder assembly 18 into engagement with the lower knife (not shown in FIG. 9).

With the rotary control knob 52 in position A, as shown in FIG. 9, pneumatic pressure will first lock the brake shoe 26. As the piston 74 bottoms out in cylinder 76, the pressure on pilot line 116 will cause valve 118 to close. At this point, pressure flows through an orifice 120 into the cylinder 56 and begins to lower the piston 54, pushing against the bias spring 64. When the piston 54 bottoms out, the nut 46 depresses the plunger 70 closing a valve 122. The pressure from the valve 122 is sensed on a pilot line 124 and closes a quick dump valve 126. The output of the quick dump valve 126 enters a cylinder 128 on the lower blade holder assembly 18 and depresses a piston 130 against a bias spring 132 thus causing the blade 20 to engage the lower knife 22 (not shown in FIG. 9).

In the A position of rotary control knob 52, the brake shoe 26 is locked and subsequently, after a delay caused by the action of orifice 120 and valve 118, the piston 54 is lowered. Thus the locking of the brake shoe 26 and the lowering of the piston takes place sequentially with the brake shoe 26 being locked first.

In the B position valves **67*a* and 67*b* will be engaged. This will result in the locking of the brake shoe 26 without the lowering of the blade holder assembly 18. In position C valves 69*a* and 69*b* will be engaged which will result in the lowering of blade holder assembly 18 without the locking of the brake shoe 26**.

When the solenoid 108 releases valve 106 and removes pressure from the system, the reverse bias on the quick dump valve 126 caused by a pilot line 134, and the absence of any pressure on the pilot line 124, will cause the quick dump valve 126 to open immediately, venting the cylinder 128. This allows the spring 132 to retract the blade 20 from engagement with the lower knife 22 immediately, that is, before the spring 64 has had a chance to raise piston 54. Quickly retracting the blade 20 in this manner prevents it from scraping against the lower knife 22 as the piston 54 is raised which would otherwise damage or possibly chip the blade 20.

Figure 4:
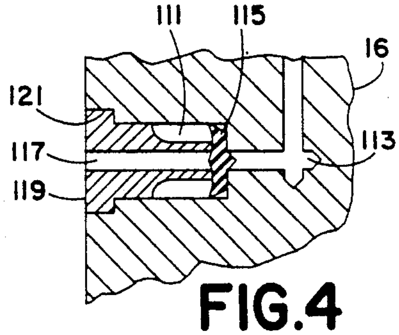
FIG. 4 is a partial cutaway view showing a quick dump valve taken along line 4—4 of FIG. 2.

The quick dump valve 126 is shown in FIG. 4. A bore 121 is filled with a plug 119 which includes a central aperture 117. The plug 119 presses against a flexible poppet 115 pushing it against an internal bore 113. Air from the cylinder 128 enters a recess 111 formed by a relieved portion 109 of the plug 119 through an inlet (not shown). When the cylinder 128 is actuated, air enters internal bore 113 flattening the poppet 115 against the relieved portion of the plug 119 permitting air to flow into the recess 111 and thence to the cylinder 128. When pressure is removed from bore 113, pressure from the cylinder 128 forces the poppet 115 into the bore 113 thus permitting air to flow to the outside through aperture 117.

Figure 10:
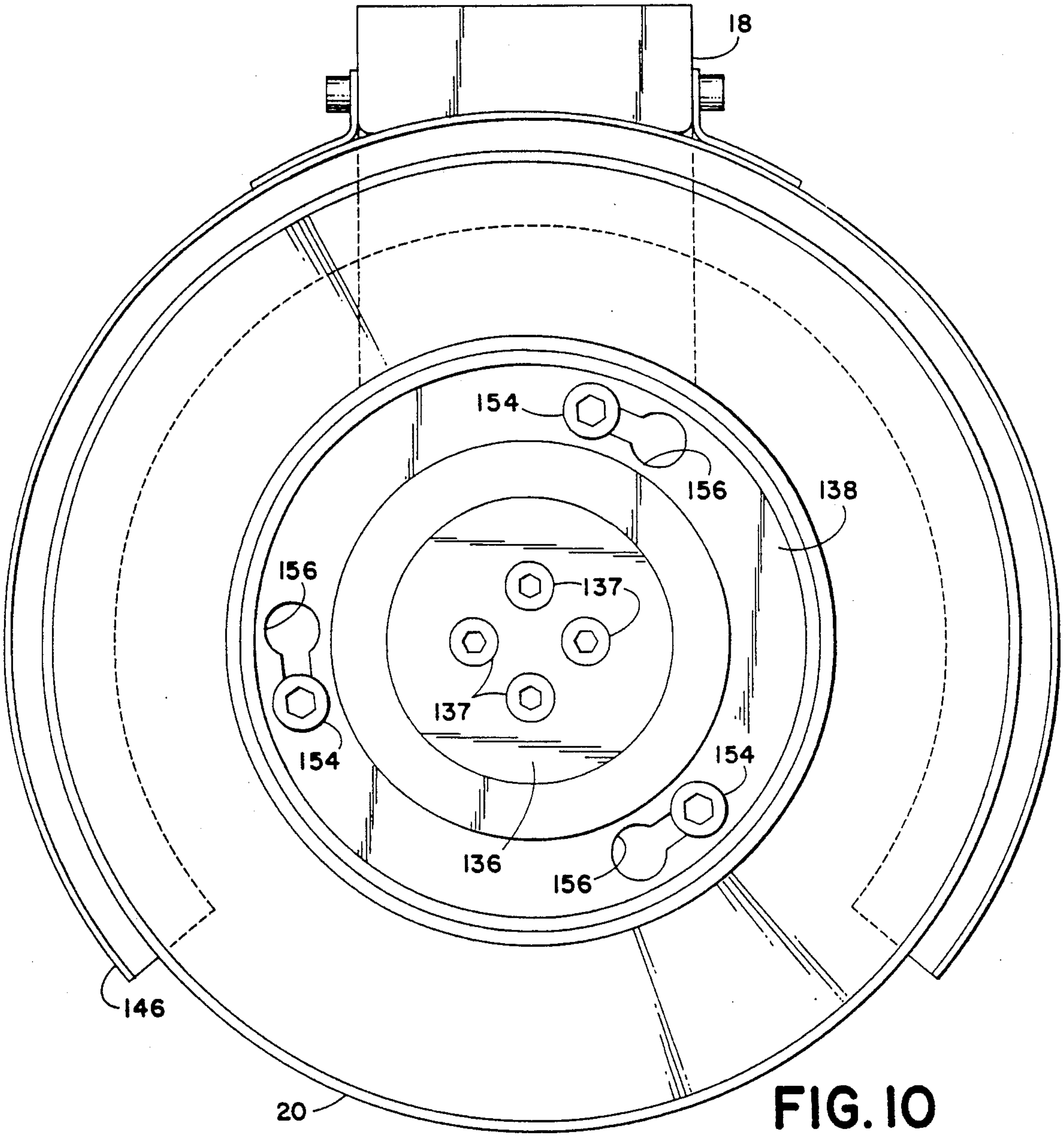
FIG. 10 is a side view of the blade holder assembly of the web slitting machine of FIG. 1.
Figure 11:
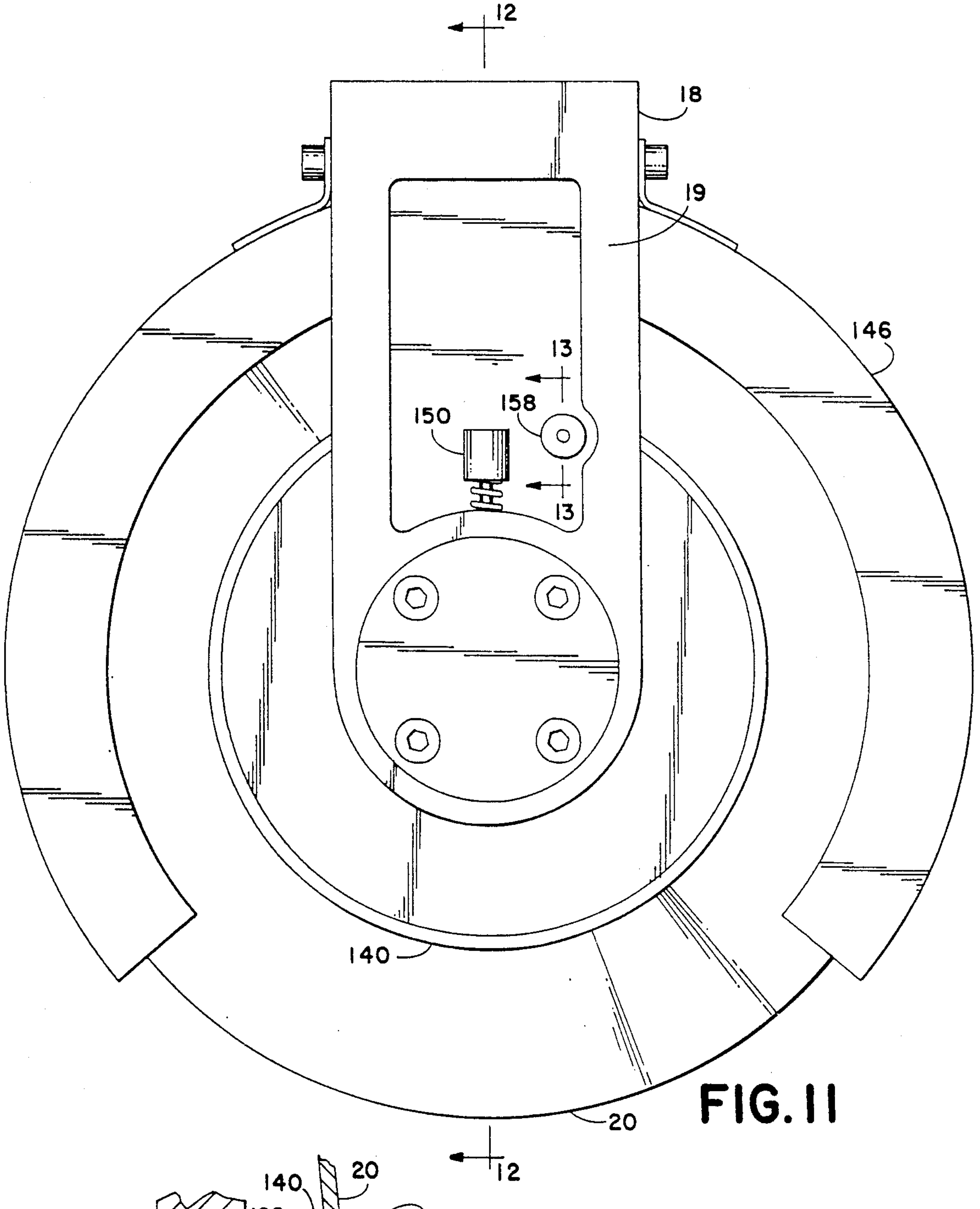
FIG. 11 is a reverse side view taken from the opposite side of the blade holder assembly shown in FIG. 10.
Figure 13:
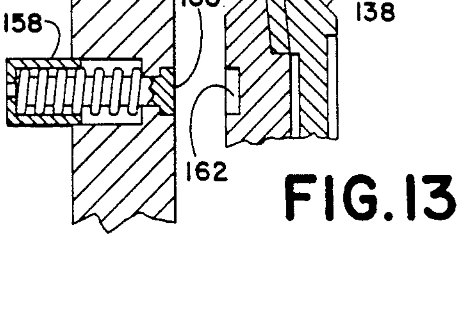
FIG. 13 is a partial cutaway view taken along line 13—13 of FIG. 11.
Figure 15:
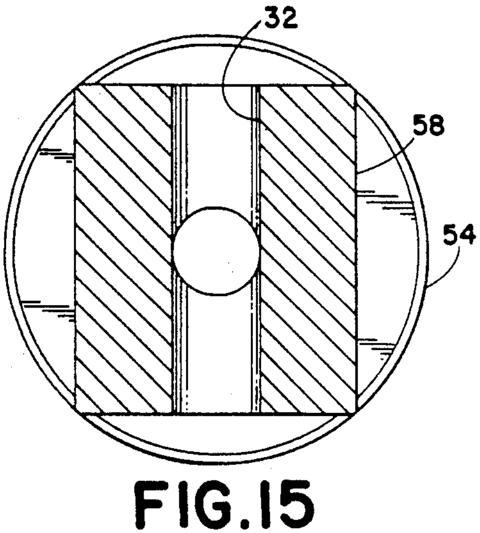
FIG. 15 is a cutaway view taken along line 15—15 of FIG. 14.
Figure 12:
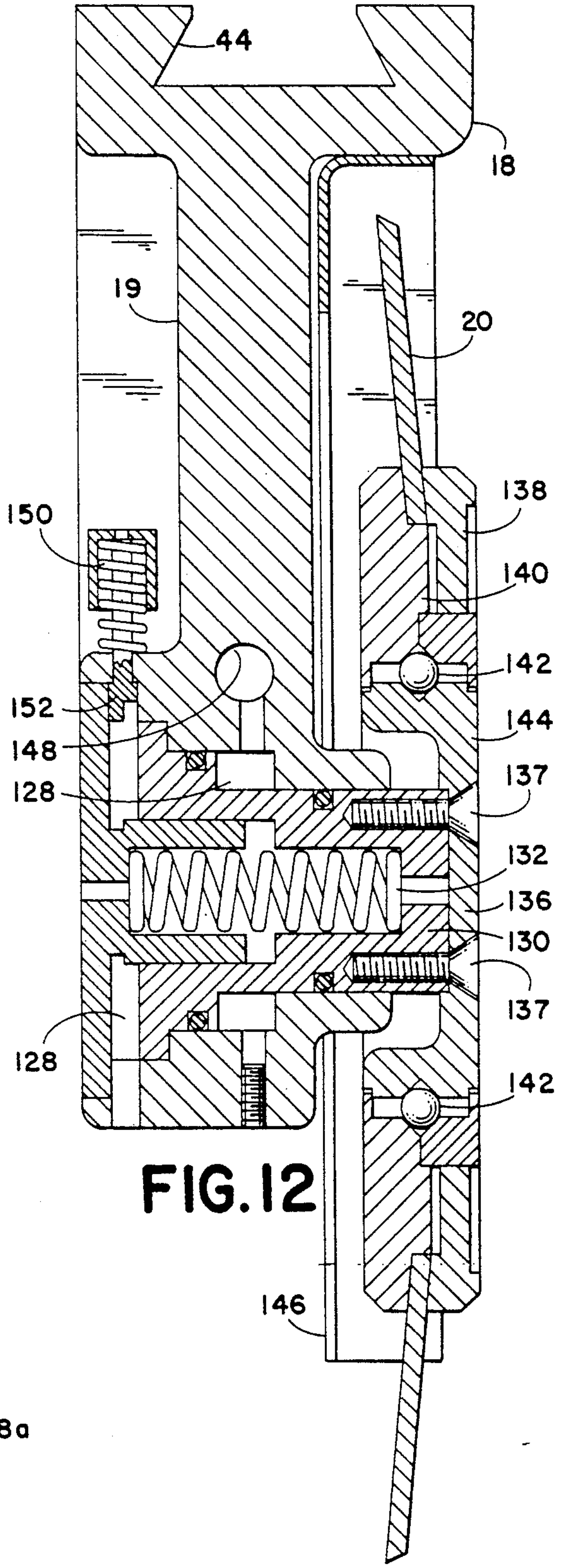
FIG. 12 is a cutaway view taken along line 12—12 of FIG. 11.

Referring to FIGS. 10, 11 and 12 the blade 20 is clamped to a hub assembly 136 by a retaining ring 138. The hub assembly 136 includes a rotating hub 140 which rotates on bearings 142 about a stationary member 144. A blade guard 146 shields all but the lower protruding portion of the blade 20. The hub assembly 136 is connected to a piston 130 by screws 137. The piston 130 moves within a cylinder 128 and is biased to a retracted position by a spring 132. Pneumatic pressure enters the cylinder 128 through a bore 148 forcing the piston 130 to bottom out against the bottom of the cylinder 128 compressing the spring 132. This provides a lateral side shifting mechanism which brings the blade 20 into engagement with the lower knife 22.

An adjustment feature is provided which permits the blade 20 to be positioned against the lower knife 22 at an optimum pressure exerted by the side shift piston 130. A push button 150 lowers a stop 152 into the cylinder 128 which stops the progress of the piston 130 exactly midway through its stroke. To make the adjustment, the rotary control knob 52 is placed in the C position which lowers the blade holder assembly 18 without locking the upper carriage 16 to the transverse bar 14. The blade 20 may then be moved laterally into contact with the lower knife 22, and the brake shoe 26 may be manually locked (or the control knob may be turned to the A position pneumatically locking the brake). The spring loaded push button 150 may then be released. This will allow the piston 130 to bottom out against cylinder 128 pressing the blade 20 against the lower knife 22 with a force which is exactly equal to the force applied by the side shift piston 130 at half stroke. This is about 40 PSI which is optimum for this type of application.

A safety feature is provided which permits easy replacement of the blade 20 without the attendant risk of an operator's hand being cut. Referring to FIG. 10, the retaining ring 138 is held in place by three bolts 154. The retaining ring 138 includes three oversize holes 156 so that when the bolts 154 are loosened and the retaining ring is twisted counterclockwise, the holes 156 will clear the bolts 154 and the retaining ring may be removed. This permits the blade 20 to be removed from the hub 140. The hub 140, however, is freely rotating and it would ordinarily be necessary for an operator to hold the blade steady with his fingers in order to remove the retaining ring 138. Referring to FIG. 11, the blade holder assembly 18 includes a stationary housing 19 which includes a push button 158 which is aligned so that a shaft 160 engages a small recess 162 in the hub 140. This acts as a rotary stop and prevents the hub 140 from rotating while the blade 20 is being replaced.

Figure 17:
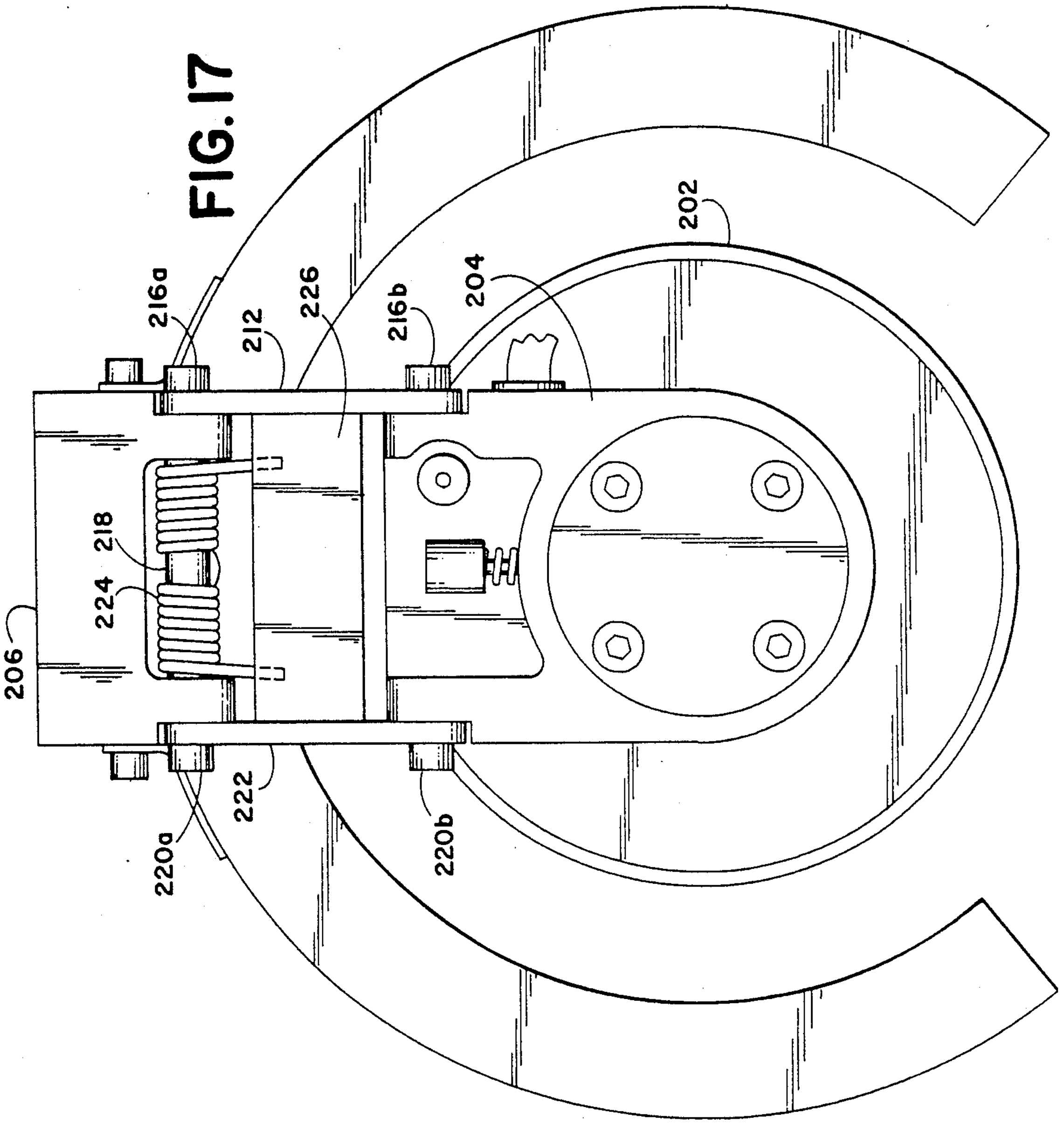
FIG. 17 is a side view of the lower blade holder assembly of FIG. 16.
Figure 16:
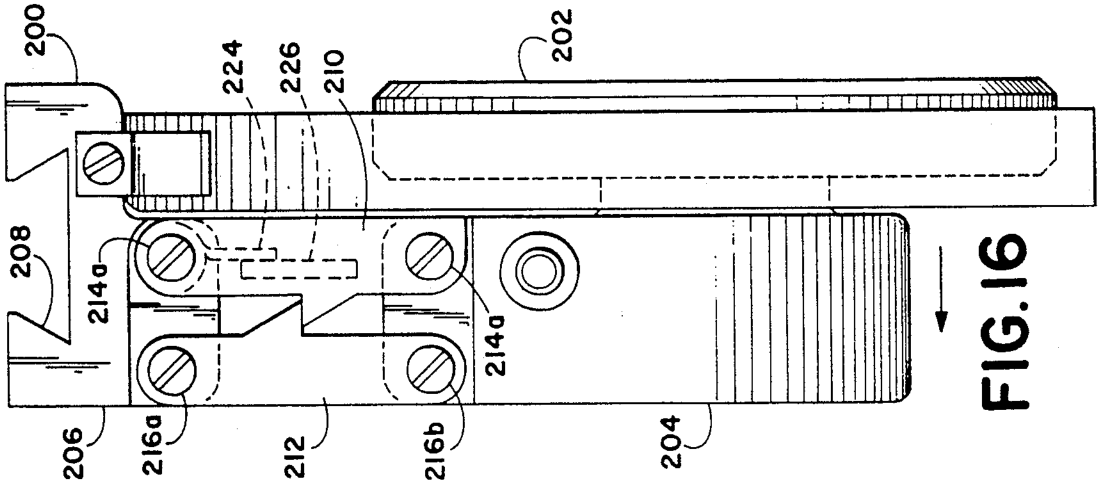
FIG. 16 is a front view of a lower blade holder assembly of an alternative design to the blade holder assembly of FIG. 10.

An alternative design for a lower blade holder assembly is shown in FIGS. 16 and 17. The lower blade holder assembly 200 includes a hub assembly 202 connected to a housing 204 which houses the side shift mechanism (not shown). The side shift mechanism contained within the housing 204 may be essentially identical to that shown in FIG. 12 and described above. The housing 204 and its associated hub assembly 202 is suspended from an upper connecting portion 206, which includes a dovetail-shaped channel 208, on a pair of links 210 and 212. The links 210 and 212 are configured as a parallelogram which pivots about bolts **214*a*, 214*b*, 216*a* and 216*b*. The bolt 214*a* connects with a rod 218 (refer to FIG. 17) which is held in place by a corresponding bolt (hidden from view by a bolt 220*a*) on the other side of the support portion 206. The parallelogram linkage is repeated on the other side of the support 206, a portion of which is shown in FIG. 17. A bolt 220*a* secures a link 222 at the top and the link 222 is secured to the housing 204 by bolt 220*b*. The fourth link is not shown, but is in all respects the same as link 210. A torsion spring 224 is wound about the rod 218 and bears against a cross member 226. The cross member 226 is secured between the link 210 and the fourth link so that the torsion spring 224 tends to push the parallelogram linkage in the direction of the arrow at the bottom of FIG. 16 thus urging the blade against the lower knife (not shown in FIG. 16). This permits the lower housing 204 and the hub assembly 202** to move laterally without tilting the blade.

In actual operation a high speed moving web may cause the blade to oscillate or wobble. The parallelogram linkage biased by the torsion spring 224 provides a restoring force which can respond quickly to this high speed phenomenon so that parallelism in the slits between adjacent web slitters is not lost. The torsion spring 224 is wound about the bar 218 with a relatively large number of turns so that the restoring force is essentially independent of lateral displacement, thus keeping the force relatively constant even when a fault in the web material shifts the blade to the side temporarily. The response of the spring is much quicker than the response of the pneumatic side shift mechanism and provides a distinct advantage in the stability of the system when dealing with a web moving at high speed.

If desired, the links 210 and 212 (and their opposite members link 222 and the link not shown) may include small complementary protrusions which act as stops to halt the movement of the housing 204 and hub assembly 202. The stops interact as the links 212 and 222 move closer together preventing any further movement.

The terms and expressions which have been employed in the abstract and foregoing specification are used therein s terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A web slitter for cutting a continuous web of material comprising:

(a) an upper carriage portion;

(b) a lower blade holder portion for holding a rotary blade, said blade holder portion having a laterally stationary support portion and a laterally movable hub portion;

(c) linkage means for coupling said laterally movable hub portion to the stationary support portion said linkage means comprising a pivotable parallelogram linkage for permitting lateral movement of the movable hub without tilting the blade; and (d) shock absorbing means coupled to the linkage means for damping oscillations of the blade.

2. The web slitter of claim 1 wherein the shock absorbing means comprises torsion spring means for urging the blade against a lower knife.

3. The web slitter of claim 2 wherein the parallelogram linkage means includes stop means for limiting the amount of lateral movement of the moveable hub portion.

4. In a web slitter having a rotary cutting blade interacting with a knife member in scissor like fashion for cutting a continuous web of material, the combination comprising:

(a) side shifting means for moving said blade laterally between a knife-engaging position and a non-engaged retracted position; and (b) stop adjust means for selectively halting the lateral movement of said blade at a midpoint between said engaged and retracted positions when said side shifting means is actuated to move said blade from said retracted position towards said knife-engaging position.

5. The web slitter of claim 4 wherein said side shifting means is pneumatically powered and includes a cylinder having a piston movable therein carrying said blade, and said stop means comprises a manually actuated stop insertable into said cylinder for impeding the progress of said piston at the midpoint of its stroke.

* * * * *

UNITED STATES PATENT AND TRADEMARK OFFICE
CERTIFICATE OF CORRECTION

PATENT NO. : 5,025,693

DATED : June 25, 1991

INVENTOR(S) : William R. Miller, et al

It is certified that error appears in the above-identified patent and that said Letters Patent is hereby corrected as shown below:

Column 7, Line 33, delete "V" and insert --U--;

Column 10, Line 34, after The bolt delete "214a" and insert --216a--; and

Column 11, Line 7, after therein delete "s" and insert --as--.

Signed and Sealed this

Ninth Day of November, 1993

Attest:

BRUCE LEHMAN

Attesting Officer

*Commissioner of Patents and Trademarks*